(12) United States Patent
Bergum

(10) Patent No.: US 8,567,242 B1
(45) Date of Patent: Oct. 29, 2013

(54) PRESSURE SENSOR VENTING SYSTEM

(75) Inventor: Alan J. Bergum, Detroit Lakes, MN (US)

(73) Assignee: S.J. Electro Systems, Inc., Detroit Lakes, MN (US)

( * ) Notice: Subject to any disclaimer, the term of this patent is extended or adjusted under 35 U.S.C. 154(b) by 258 days.

(21) Appl. No.: 13/043,849

(22) Filed: Mar. 9, 2011

Related U.S. Application Data

(60) Provisional application No. 61/340,087, filed on Mar. 11, 2010.

(51) Int. Cl.
*G01F 23/00* (2006.01)

(52) U.S. Cl.
USPC ...... 73/299; 73/290 R; 73/861.42; 73/861.47; 73/700; 73/708; 73/715

(58) Field of Classification Search
USPC .................. 73/200, 299, 861.47, 273, 272 R
See application file for complete search history.

(56) References Cited

U.S. PATENT DOCUMENTS

| | | | |
|---|---|---|---|
| RE24,410 E * | 12/1957 | Drake ........................... | 137/100 |
| 4,084,435 A * | 4/1978 | Weik et al. ..................... | 73/299 |
| 4,112,760 A * | 9/1978 | Ishiwata ........................ | 73/299 |
| 4,373,388 A * | 2/1983 | Kitamura et al. ............... | 73/301 |
| 4,843,883 A * | 7/1989 | Glover et al. .................. | 73/301 |
| 5,167,155 A * | 12/1992 | Rodgers ......................... | 73/299 |
| 7,895,890 B2 * | 3/2011 | Van Ee ........................... | 73/298 |
| 2007/0068856 A1 * | 3/2007 | Chaffee ......................... | 210/104 |

OTHER PUBLICATIONS

Motorola Semiconductor Technical Data for MPX5050/D.*
Motorola Semiconductor Technical Data for MPX5050/D, 1997.*

* cited by examiner

*Primary Examiner* — Hezron E Williams
*Assistant Examiner* — Alexander Mercado
(74) *Attorney, Agent, or Firm* — Michael S. Neustel

(57) ABSTRACT

A pressure sensor venting system for efficiently and accurately measuring a liquid level. The pressure sensor venting system generally includes a housing, a pressure transducer within the housing, a diaphragm, a pressure passage fluidly connecting the pressure transducer and a pressurized liquid from the diaphragm, and a first vent tube that is fluidly connected to the pressure transducer opposite of the pressure passage. The distal end of the first vent tube extends outwardly from the housing and extends a distance into a second vent tube. The second vent tube is fluidly connected to liquid resistant vent that is positioned within the interior space of the liquid container and above the liquid level.

16 Claims, 4 Drawing Sheets

PRESSURE SENSOR VENTING SYSTEM

CROSS REFERENCE TO RELATED APPLICATIONS

I hereby claim benefit under Title 35, United States Code, Section 119(e) of U.S. provisional patent application Ser. No. 61/340,087 filed Mar. 11, 2010. The 61/340,087 application is currently pending. The 61/340,087 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a submersible pressure transducer and more specifically it relates to a pressure sensor venting system for efficiently and accurately measuring a liquid level.

2. Description of the Related Art

Any discussion of the related art throughout the specification should in no way be considered as an admission that such related art is widely known or forms part of common general knowledge in the field.

Fluid pressure transducers are utilized to measure fluid pressure to determine the fluid depth, fluid level, and other variables related to the fluid. Fluid pressure transducers are typically comprised of a pressure transducer that converts the fluid pressure to an electrical signal that can be utilized to provide a level measurement of fluid in a tank (e.g. septic tank), pumping chamber or other fluid tank. Conventional pressure transducers utilize a flat diaphragm comprised of a resilient material such as rubber. The pressure transducer is positioned within the fluid with the flat diaphragm measuring the pressure of the fluid to determine the level of fluid. The external fluid pressure causes a piston adjacent to the flat diaphragm or a liquid within the diaphragm to be compressed. The compression force is transferred to a pressure transducer which converts the pressure to an electrical signal which can then be used to provide a measurement reading, provide a warning, activate a pump or other actions based on the measurement. The pressure transducer can be in communication with any external device such as but not limited to a pump switch, a circuit board, a display, a warning device and the like.

One of the main problems with convention fluid pressure transducers is venting the pressure transducer to get a true atmospheric reading in the liquid container. One problem with venting a pressure transducer is getting liquid inside of the venting resulting in inaccurate readings. Another problem with venting a pressure transducer is that the current solution is to vent the pressure transducer outside of the liquid container and in the junction box, however this results in an atmospheric pressure that can be significantly different from what the true atmospheric pressure is within the liquid container. In addition, temperature differences between the interior and exterior of the tank can cause condensation to incur within the vent.

Because of the inherent problems with the related art, there is a need for a new and improved pressure sensor venting system for efficiently and accurately measuring a liquid level.

BRIEF SUMMARY OF THE INVENTION

A system for efficiently and accurately measuring a liquid level. The invention generally relates to a pressure transducer which includes a housing, a pressure transducer within the housing, a diaphragm, a pressure passage fluidly connecting the pressure transducer and a pressurized liquid from the diaphragm, and a first vent tube that is fluidly connected to the pressure transducer opposite of the pressure passage. The distal end of the first vent tube extends outwardly from the housing and extends a distance into a second vent tube. The second vent tube is fluidly connected to liquid resistant vent that is positioned within the interior space of the liquid container and above the liquid level.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
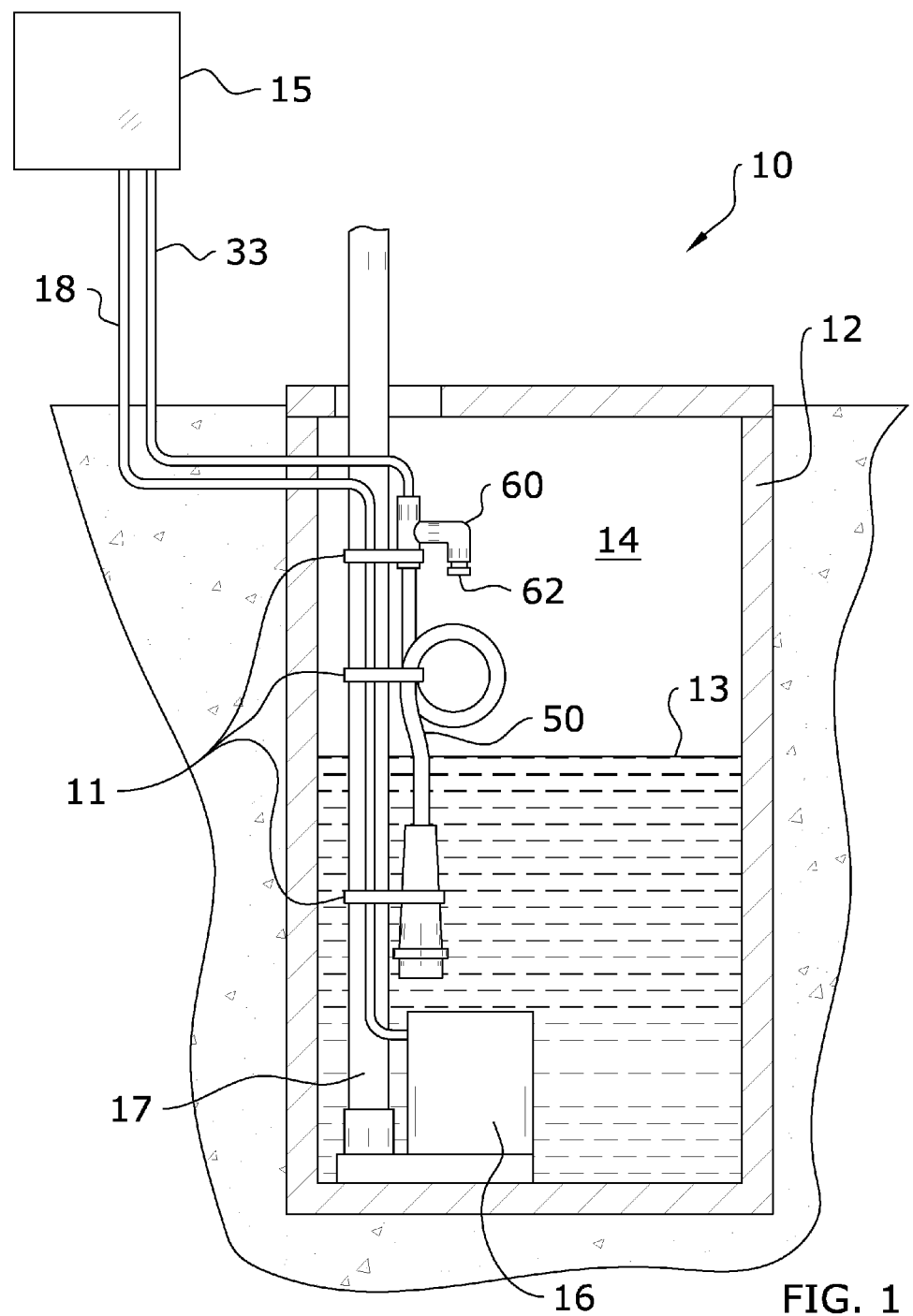
FIG. 1 is a side view of the present invention installed within a septic tank system.

A. Overview.

Turning now descriptively to the drawings, in which similar reference characters denote similar elements throughout the several views, FIGS. 1 through 3*b* illustrate a pressure sensor venting system 10, which comprises a housing 20, a pressure transducer 32 within the housing 20, a diaphragm 40, a pressure passage 34 fluidly connecting the pressure transducer 32 and a pressurized liquid from the diaphragm 40, and a first vent tube 36 that is fluidly connected to the pressure transducer 32 opposite of the pressure passage 34. The distal end 37 of the first vent tube 36 extends outwardly from the housing 20 and extends a distance into a second vent tube 50. The second vent tube 50 is fluidly connected to liquid resistant vent 60 that is positioned within the interior space 14 of the liquid container 12 and above the liquid level 13.

B. Exemplary Liquid Container.

FIG. 1 illustrates an exemplary liquid container 12 comprised of a septic tank suitable for usage with the present invention. The liquid container 12 is adapted to receive a volume of liquid (e.g. water) and retain the liquid for a period of time. As shown in FIG. 6 of the drawings, a pump 16 may be positioned within the liquid container 12 to pump 16 out liquid from the liquid container 12 through a discharge pipe 17. A junction box 15 may be in communication with the pump 16 via a power cord 18 to activate the pump 16 and to the pressure transducer 32 via a communication cable 33. The junction box 15 may include additional electronic devices as is well known in the septic tank industry.

C. Housing.

FIGS. 1 through 3b illustrate an exemplary housing 20. The housing 20 may have various shapes and configurations capable of storing the electronic devices and other components relating to the pressure transducer 32 such as but not limited to the pressure transducer 32, a circuit board 30 and the like. The housing 20 is illustrated as an elongated structure however various other configurations for the sensor housing 20 may be utilized. The housing 20 may be positioned in a stationary location within the liquid container 12 utilizing various connection devices such as but not limited to straps and clamps 11 The lower end of the housing 20 where the diaphragm 40 extends from is preferably located at the desired depth within the liquid container 12 where the fluid pressure is to be read.

Figure 3A:
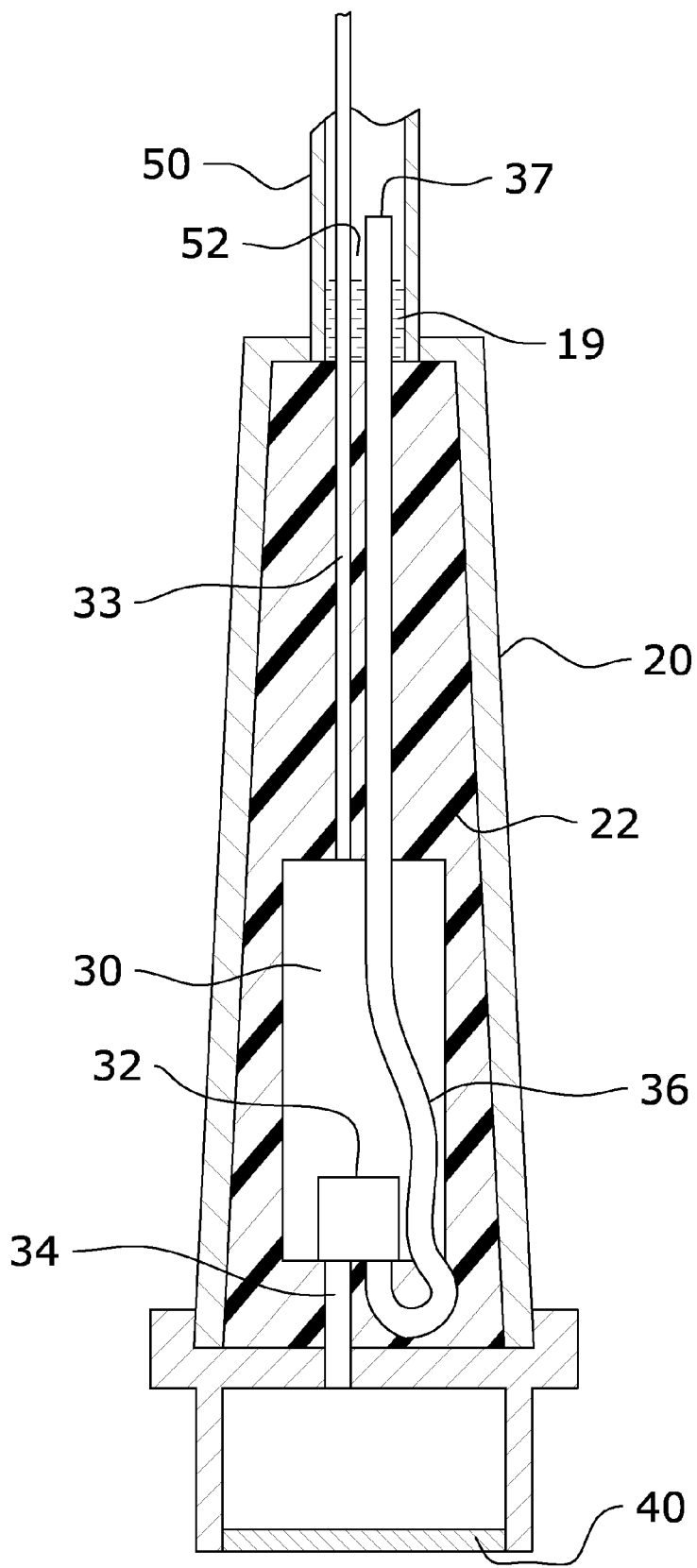
FIG. 3*a* is a side cutaway view of the present invention illustrating the first vent tube extending outside of the housing and being surrounded by the second vent tube to form a collection area.
Figure 3B:
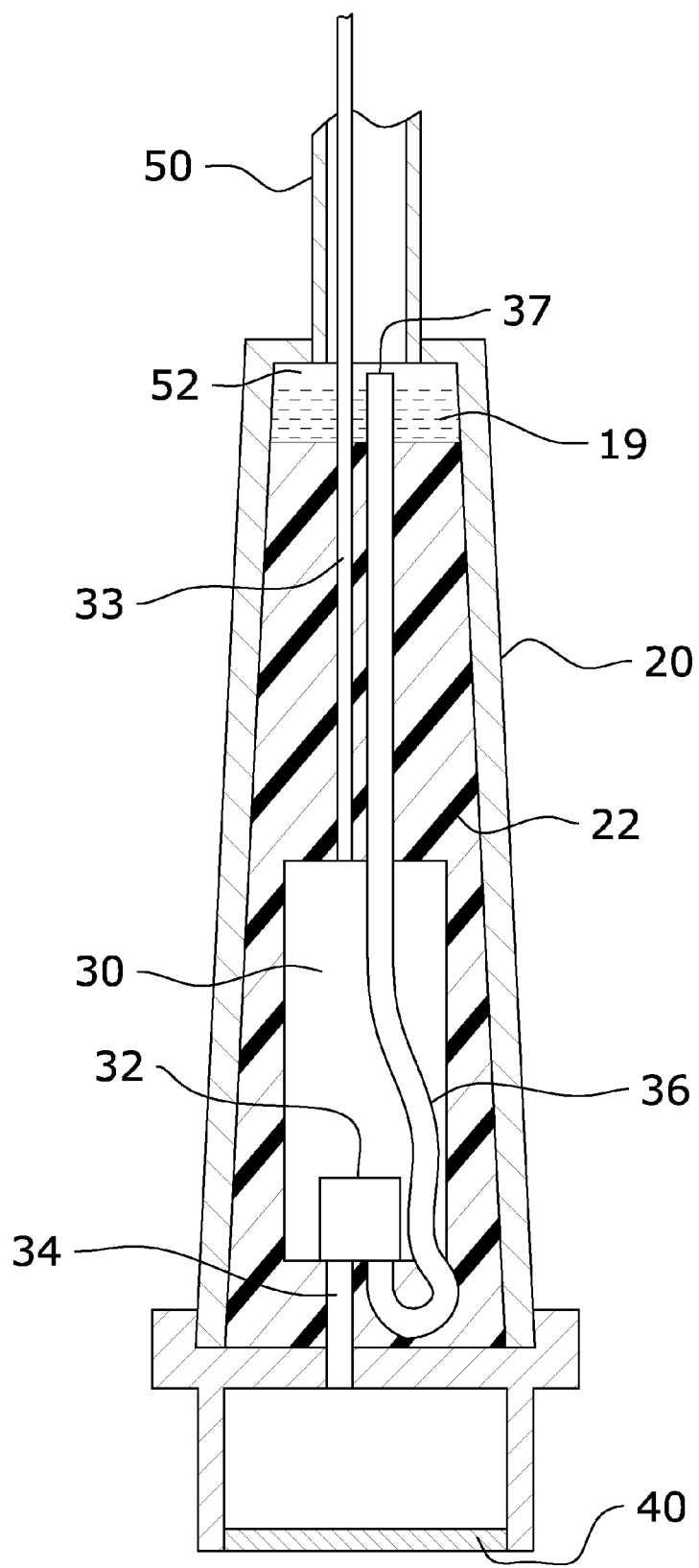
FIG. 3*b* is a side cutaway view of the present invention illustrating the first vent tube within the housing and with the fill material only partially filling the housing thereby forming a collection area in the upper portion of the housing.

The housing 20 preferably includes a fill material 22 (e.g. resin) surrounding the pressure transducer 32, the circuit board 30 electrically connected to the pressure transducer 32 and any other electronics to prevent liquid from making contact with the electronics. The upper end of the fill material 22 preferably forms the floor of the collection area 52. The fill material 22 may only fill a portion of the housing 20 as illustrated in FIG. 3b or the fill material 22 may completely fill the interior of the housing 20 as illustrated in FIG. 3a. When the fill material 22 only fills a portion of the housing 20, the upper portion of the housing may be utilized to define the collection area 52 and the first vent tube 36 does not have to extend outside of the housing 20.

A diaphragm 40 may be attached to the housing 20 with a pressure liquid positioned within the diaphragm 40. The diaphragm 40 is preferably comprised of a resilient and flexible material such as but not limited to rubber. The pressure liquid is fluidly connected to the pressure transducer 32 via the pressure passage 34 to transfer the pressure of the liquid outside of the diaphragm 40 as illustrated in FIG. 3a. While a diaphragm 40 is preferred to keep the pressure transducer 32 away from the harsh environment, it can be appreciated that a diaphragm 40 is not required since the pressure transducer 32 may have some direct contact with the liquid within the liquid container 12 to measure the pressure of the liquid.

D. Pressure Transducer.

The pressure transducer 32 may be comprised of any pressure sensor device that is capable of receiving and measuring physical pressure from pressure fluid within the diaphragm 40 (or external pressure of liquid outside of the housing 20) and then converts the measured pressure to an electrical signal (e.g. piezoresistive pressure sensor or silicon cell). The electrical signal is communicated via the communication cable 33 to the junction box 15 where the signal may be calculated and utilized to control a pump 16 operation, cause an alarm or other action based on the measurement. A communication cable 33 preferably extends through the second vent tube 50 from the junction box 15 into the housing 20 and is in electrical communication with the pressure transducer 32 and/or circuit board 30.

A pressure passage 34 is fluidly connected between the interior of the diaphragm 40 and the pressure transducer 32 to transfer the fluid pressure from the pressure fluid within the diaphragm 40 to the pressure transducer 32. A first vent tube 36 is preferably in fluid communication with the pressure transducer 32 and is adapted to be vented to the interior space 14 of the liquid container 12 to provide a normal atmospheric pressure opposite of the pressure from the pressure fluid received from the diaphragm 40.

E. First Vent Tube.

The first vent tube 36 is fluidly connected to the pressure transducer 32 and extends upwardly through a floor of a collection area 52 as best illustrated in FIG. 3a of the drawings. As further shown in FIG. 3a, a distal end 37 of the first vent tube 36 extends above the floor of the collection area 52 so that water and other liquids that accidentally enter are retained within the collection area 52 and do not enter the first vent tube 36 which could interfere with the pressure readings by the pressure transducer 32. The collection area 52 is adapted to be vented to the interior space 14 of the liquid container 12 above the liquid level 13.

As shown in FIG. 3a of the drawings, the distal end 37 of the first vent tube 36 preferably extends outside of the housing 20 and is surrounded by the second vent tube 50. As can be appreciated, the distal end 37 of the first vent tube 36 is not required to extend outside of the housing 20 and may remain within the interior of the housing 20. The second vent tube 50 may extend into the interior portion of the housing 20 and surround the distal end 37 of the first vent tube 36. Alternatively, the collection area 52 may be formed within the housing 20 with the fill material 22 leaving an upper space within the housing 20 as illustrated in FIG. 3b of the drawings. In the alternative embodiment, the first vent tube 36 may remain within the housing 20 or extend outside of the housing 20.

F. Second Vent Tube.

Figure 2:
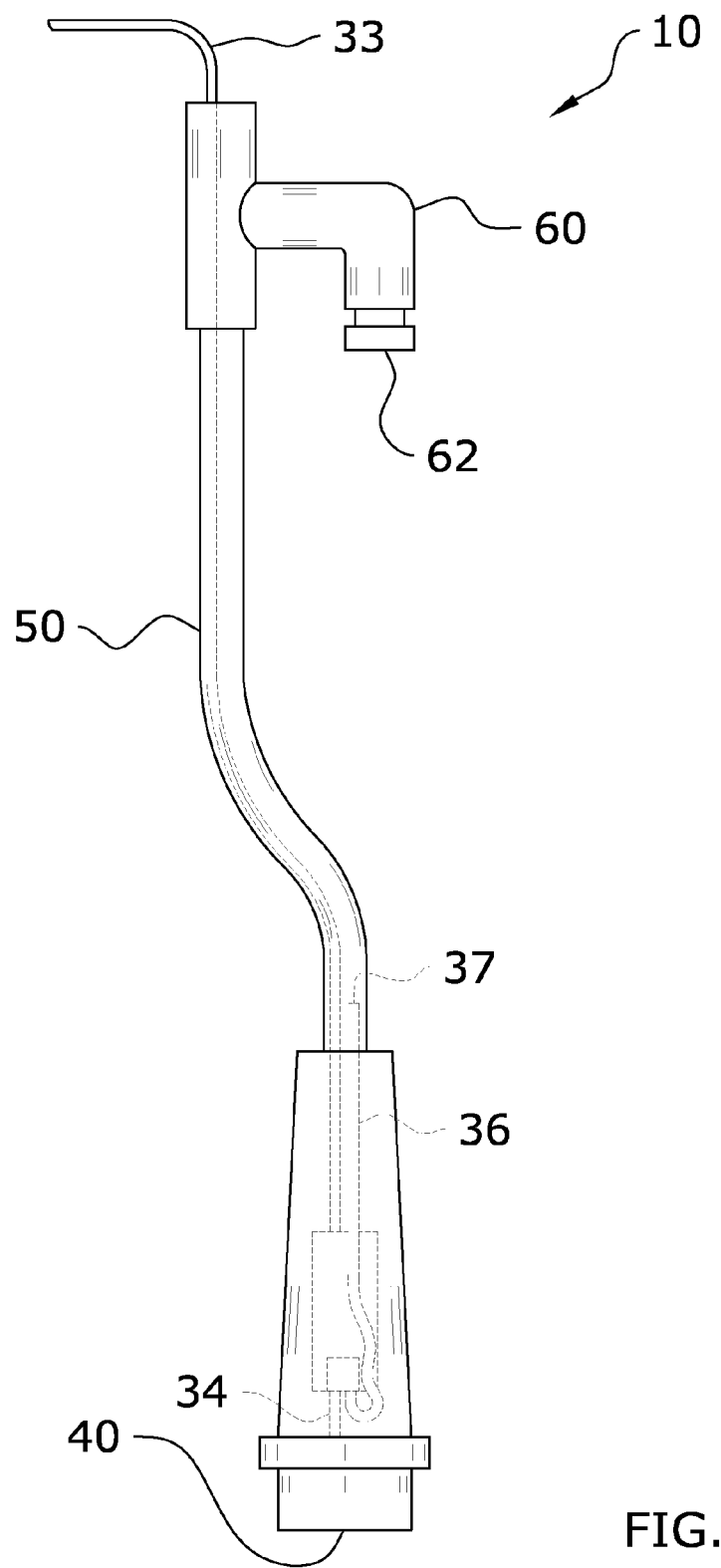
FIG. 2 is a side view of the present invention.

The second vent tube 50 is attached to the housing 20 and surrounds the first vent tube 36 as shown in FIGS. 1 through 3 of the drawings. The second vent tube 50 may extend into the housing 20. The second vent tube 50 extends away from the housing 20 a distance further than the first vent tube 36 as illustrated in FIGS. 2 and 3 of the drawings. The second vent tube 50 is adapted to be vented to the interior space 14 of the liquid container 12 above the liquid level 13.

The second vent tube 50 is comprised of a cross section larger than a cross section of the first vent tube 36. The communication cable 33 preferably extends through the second vent tube 50 as illustrated FIG. 2 of the drawings. The communication cable 33 is protected by the second vent tube 50 and also prevents closing of the second vent tube 50 due to bending at an excessive angle or due to external pressure from an object (e.g. a tie strap).

It is preferable that a liquid resistant vent 60 having a vent intake 62 positioned above the liquid level 13 be fluidly connected to the second vent tube 50 in a sealed manner to provide air to the interior of the second vent tube 50 from the interior space 14 of the liquid container 12 with a limited amount of liquid or water vapor entering the same. The liquid resistant vent 60 may be constructed of any vent structure capable of allowing air to enter and that prevents the entry of water or water vapor. The liquid resistant vent 60 also allows the communication cable 33 to pass through in a sealed manner and externally thereof to the junction box 15 as shown in FIGS. 1 and 2 of the drawings.

G. Operation of Preferred Embodiment.

In use, the housing 20 is positioned within the interior of the liquid container 12 at a depth desired to measure the liquid pressure. The housing 20 may be secured in the stationary location with a clamp 11 to the discharge pipe 17 as illustrated in FIG. 1 of the drawings. The liquid resistant vent 60 is positioned above the maximum liquid level 13 within the interior of the liquid container 12. The liquid resistant vent 60 may be secured to the discharge pipe 17 with a clamp 11 or other device as shown in FIG. 1 of the drawings. Any excess length of the second vent tube 50 may be coiled and secured to the discharge pipe 17 with another clamp 11 as illustrated in FIG. 1 of the drawings.

When no liquid is within the liquid container 12 or when the liquid is below the diaphragm 40 of the pressure transducer 32, the pressure detected by the pressure transducer 32 is approximately zero since the atmospheric pressure within the interior space 14 of the liquid container 12 is being utilized for both the diaphragm 40 and the first vent tube 36. When liquid such as water enters the liquid container 12, the water level rises above the diaphragm 40 which results in a pressure being transferred to the pressure transducer 32. The pressure transducer 32 measures the pressure applied by the liquid compared to the atmospheric pressure within the interior space 14 of the liquid container 12 and then transmits an electrical signal via the communication cable 33 to the junction box 15 or other device. The pump 16 may be operated based on the liquid level 13 reaching a specific level within the interior of the liquid container 12.

The liquid resistant vent 60 allows air to enter the second vent tube 50 with limited entry of water or water vapor. However, if any water or other liquid does enter the second vent tube 50, the liquid will drain downwardly into the collection area 52 surrounding the distal portion of the first vent tube 36 as collected liquid 19 as shown in FIG. 3a. The collected liquid 19 settles within the collection area 52 and since it is below the distal end 37 of the first vent tube 36 the atmospheric pressure within the first vent tube 36 that is passed to the pressure transducer 32 is not negatively affected by the collected liquid 19 within the collection area 52.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above.

All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A liquid pressure sensor system, comprising:
    a housing;
    a pressure transducer within said housing having a pressure passage adapted to receive an external pressure of liquid outside of said housing;
    a first vent tube fluidly connected to said pressure transducer and extending upwardly through a floor of a collection area, wherein a distal end of said first vent tube extends above said floor of said collection area, and wherein said collection area is adapted to be vented to an interior space of a liquid container above a liquid level; and
    a second vent tube attached to said housing and surrounding said first vent tube, wherein said second vent tube extends away from said housing a distance further than said first vent tube;
    wherein said housing includes a solid fill material surrounding said pressure transducer, wherein an upper end of said solid fill material forms said floor of said collection area.

2. The liquid pressure sensor system of claim 1, wherein said distal end of said first vent tube extends outside of said housing.

3. The liquid pressure sensor system of claim 1, wherein said second vent tube is adapted to be vented to said interior space of said liquid container above said liquid level.

4. The liquid pressure sensor system of claim 1, including a liquid resistant vent fluidly connected to said second vent tube and adapted to be vented to said interior space of said liquid container, wherein said liquid resistant vent is capable of allowing air to enter said second vent tube while preventing entry of water or water vapor into said second vent tube.

5. The liquid pressure sensor system of claim 1, including a communication cable extending through said second vent tube into said housing and electrically communicating with said pressure transducer.

6. The liquid pressure sensor system of claim 1, including a communication cable extending from said pressure transducer through said second vent tube.

7. The liquid pressure sensor system of claim 1, including a diaphragm attached to said housing and a pressure liquid positioned within said diaphragm that is fluidly connected to said pressure transducer via said pressure passage.

8. The liquid pressure sensor system of claim 1, wherein said pressure transducer converts a pressure received via the pressure passage into an electrical signal.

9. A liquid pressure sensor system positioned within a liquid container, comprising:
    a liquid container, wherein said liquid container includes an interior space above a liquid level within said liquid container;
    a pump within said liquid container having a discharge pipe extending outside of said liquid container;
    a housing positioned within said liquid container and at least partially below said liquid level within said liquid container;
    a pressure transducer within said housing having a pressure passage adapted to receive an external pressure of liquid outside of said housing;
    a first vent tube fluidly connected to said pressure transducer and extending upwardly through a floor of a collection area, wherein a distal end of said first vent tube extends above said floor of said collection area, and wherein said collection area is adapted to be vented to an interior space of a liquid container above a liquid level; and
    a second vent tube attached to said housing and surrounding said first vent tube, wherein said second vent tube extends away from said housing a distance further than said first vent tube;
    wherein said housing includes a solid fill material surrounding said pressure transducer, wherein an upper end of said solid fill material forms said floor of said collection area.

10. The liquid pressure sensor system of claim 9, wherein said distal end of said first vent tube extends outside of said housing.

11. The liquid pressure sensor system of claim 9, wherein said second vent tube is adapted to be vented to said interior space of said liquid container above said liquid level.

12. The liquid pressure sensor system of claim 9, including a liquid resistant vent fluidly connected to said second vent tube and adapted to be vented to said interior space of said liquid container, wherein said liquid resistant vent is capable of allowing air to enter said second vent tube while preventing entry of water or water vapor into said second vent tube.

13. The liquid pressure sensor system of claim 9, including a communication cable extending through second vent tube into said housing and electrically communicating with said pressure transducer.

14. The liquid pressure sensor system of claim 9, including a communication cable extending from said pressure transducer through said second vent tube.

15. The liquid pressure sensor system of claim 9, including a diaphragm attached to said housing and a pressure liquid positioned within said diaphragm that is fluidly connected to said pressure transducer via said pressure passage.

16. A liquid pressure sensor system positioned within a liquid container, comprising:
   a liquid container comprised of a septic tank, wherein said liquid container includes an interior space above a liquid level within said liquid container;
   a pump within said septic tank having a discharge pipe extending outside of said liquid container;
   a housing positioned within said liquid container and at least partially below said liquid level within said liquid container;
   a pressure transducer within said housing having a pressure passage adapted to receive an external pressure of liquid outside of said housing;
   wherein said pressure transducer converts a pressure received via said pressure passage into an electrical signal;
   a first vent tube fluidly connected to said pressure transducer and extending upwardly through a floor of a collection area, wherein a distal end of said first vent tube extends above said floor of said collection area, and wherein said collection area is adapted to be vented to said interior space of said liquid container above said liquid level;
   wherein said distal end of said first vent tube extends outside of said housing;
   a second vent tube attached to said housing and surrounding said first vent tube, wherein said second vent tube extends away from said housing a distance further than said first vent tube;
   wherein said second vent tube is adapted to be vented to said interior space of said liquid container above said liquid level;
   wherein said second vent tube is comprised of a cross section larger than a cross section of said first vent tube;
   a liquid resistant vent fluidly connected to said second vent tube and adapted to be vented to said interior space of said liquid container;
   a communication cable extending through second vent tube into said housing and electrical communication with said pressure transducer;
   wherein said housing includes a solid fill material surrounding said pressure transducer, wherein an upper end of said solid fill material forms said floor of said collection area; and
   a diaphragm attached to said housing and a pressure liquid positioned within said diaphragm that is fluidly connected to said pressure transducer via said pressure passage.

* * * * *